(No Model.)
S. O. WILSON.
VEHICLE AXLE.
No. 534,807. Patented Feb. 26, 1895.
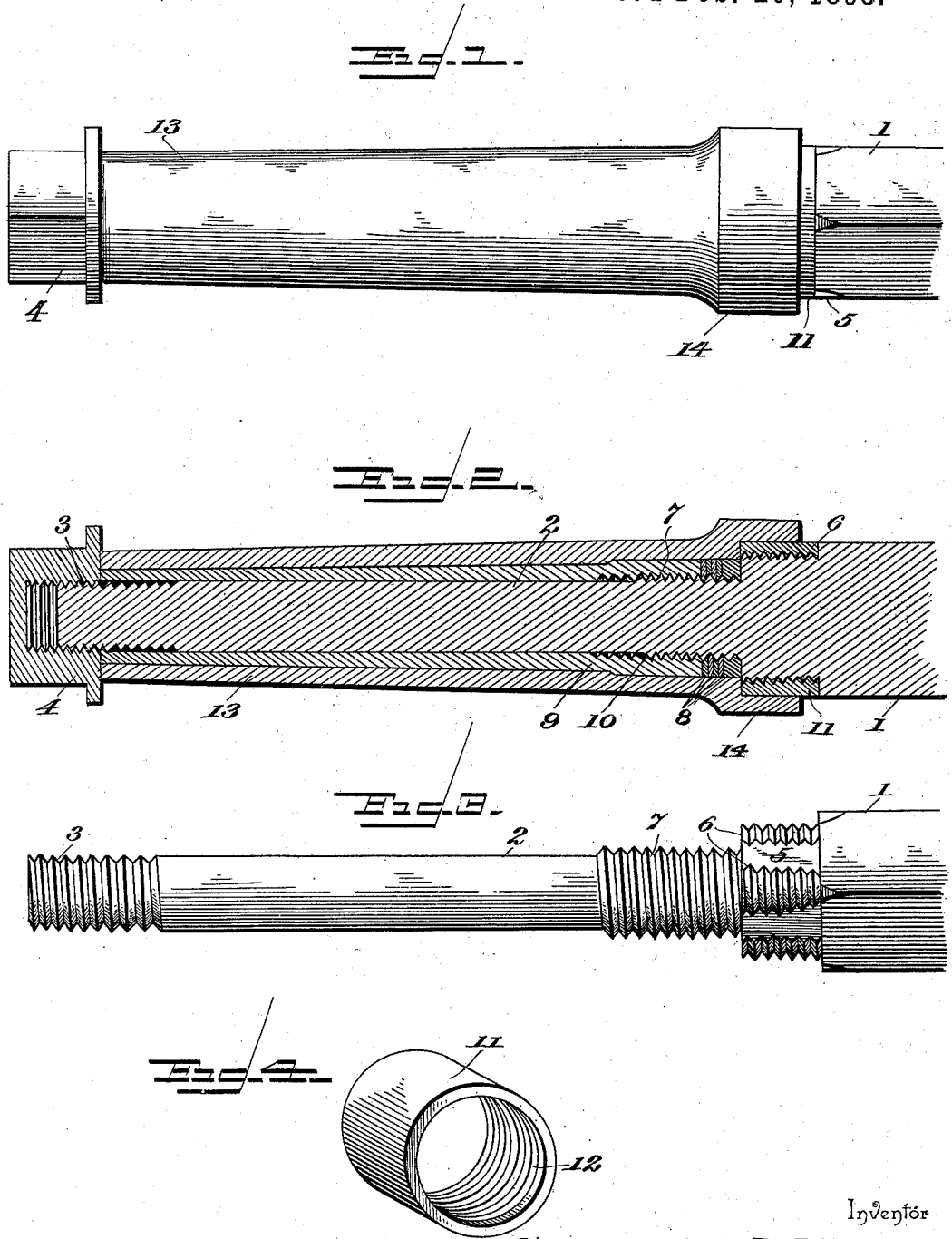
Inventor
Stephen Otho Wilson
By his Attorneys.
Witnesses

UNITED STATES PATENT OFFICE.

STEPHEN OTHO WILSON, OF RALEIGH, NORTH CAROLINA, ASSIGNOR OF ONE-HALF TO HAL W. AYER, OF SAME PLACE.

VEHICLE-AXLE.

SPECIFICATION forming part of Letters Patent No. 534,807, dated February 26, 1895.

Application filed February 28, 1894. Serial No. 501,869. (No model.)

*To all whom it may concern:*

Be it known that I, STEPHEN OTHO WILSON, a citizen of the United States, residing at Raleigh, in the county of Wake and State of North Carolina, have invented a new and useful Vehicle-Axle, of which the following is a specification.

My invention relates to improvements in axles for vehicles, cars and the like, and the objects in view are to so construct the axle as to obviate wear upon the spindle proper; to provide for a renewal of the skein or bearing, and adjustment of the same for the purpose of compensating for wear, and taking up lost motion.

Other objects and advantages of the invention will appear in the following description, and the novel features thereof will be particularly pointed out in the claims.

Referring to the drawings:—Figure 1 is an elevation of one end of an axle constructed in accordance with my invention. Fig. 2 is a longitudinal sectional view of the same. Fig. 3 is a detail of the axle with the skein, box, collar and nut removed. Fig. 4 is a detail of the collar.

Like numerals of reference indicate like parts in all the figures of the drawings.

In the practice of my invention I produce the usual axle 1, which is rectangular in cross-section, and reduce the end thereof to form the usual spindle 2, at whose outer end or extremity threads 3 are cut for the accommodation of the nut 4. By the reduction of the axle for the purpose of forming the spindle 2 a shoulder 5 is produced, and this shoulder has its four corners threaded, as indicated at 6. Adjacent to the shoulder the spindle 2 is slightly greater in diameter than farther on, and this is also externally threaded, as indicated at 7. Over this threaded portion 7 I pass a plurality of annular washers 8, preferably of steel, the said washers covering a portion of the threads 7, after which I slip over the spindle a skein or sleeve 9, which fits the spindle snugly, yet removably, and terminates at its outer end intermediate of the ends of the threaded portion 3 for the accommodation of the nut; and its inner end is internally threaded at 10, so as to engage the threads 7 of the spindle and be rotated thereupon until it bears against the series of washers 8 hereinafter described. The exterior of the skein or sleeve may be provided with any number of oil-grooves that are desired. An annular collar 11 is next slipped over the sleeve or skein, it being slightly greater in diameter than the same, and is internally threaded at 12 so as to engage with the threads 6 on the axle, to advance the shoulder to take up lost motion. This completes the bearing of the axle, and upon it is arranged the usual box located in the hub of the wheel. This box I have indicated by the numeral 13, it being of the ordinary construction and having its inner end flared, as at 14, so as to take over the collar in the same manner that such boxes usually inclose the integral collars of axles.

It will be seen from the foregoing that all wear of the box comes upon the under side of the sleeve or skein, and not upon the spindle proper of the axle, and when said skein or collar has been worn to such an extent as to require replacing the same may be readily accomplished by simply removing the nut and wheel and subsequently unscrewing the spindle from its position. Like the wear upon the usual spindles, such will come upon the under side of the skein, and by removing the skein and subsequently one or more of the washers, the skein may be partially rotated so as to bring its worn side uppermost. The collar may also be adjusted with reference to the skein, in order to advance its engaged shoulder to take up lost motion as may be required. When the ends of the axle box become worn one or more of the washers 8 may be removed, to enable the skein or sleeve 9 and the nut 4 to be advanced to shorten the bearing of the axle and take up the wear.

From the foregoing description it will be seen that I have provided a very simple construction of bearing for axles, wherein the spindle of the axle is prevented from wear and all wear taken by a skein or sleeve that may be cheaply and quickly replaced when worn to such an extent as to require it; and which may be turned one or more times so as to bring any worn portions to the bearing point; and finally, which is capable of adjustment by means of the washers, so as to render the bearing longer or shorter, as required.

It will also be apparent that the improvements are applicable to all classes of axles, such as car, engine, harvester, and the like.

Having described my invention, what I claim is—

1. The combination of an axle having a spindle and provided at the inner end thereof with a shoulder, said spindle being threaded beyond the shoulder and having its outer end threaded, a plurality of cylindrical washers arranged on the threaded portion of the spindle against the shoulder, a skein or sleeve arranged on the spindle and having its inner end interiorly threaded and bearing against the washers and engaging the adjacent threads of the spindle, the outer surface of the sleeve or skein being flush with the washers and the outer end of the sleeve or skein being extended over a portion of the threads at the outer end of the spindle, an axle-box arranged on the sleeve or skein and engaging the shoulder of the axle and extended inward beyond the same, the outer end of the axle-box terminating adjacent to that of the sleeve or skein, and an axle nut arranged on the outer end of the spindle and engaging the ends of the sleeve or skein and the axle-box, substantially as described.

2. The combination with the axle reduced to form a spindle and an adjacent shoulder, the latter together with the inner end of the spindle being threaded, a plurality of washers arranged against the shoulder, a skein or sleeve slipped over the spindle and internally threaded to engage with the inner threads thereof, and a collar threaded on the shoulder of the axle, substantially as specified.

In testimony that I claim the foregoing as my own I have hereto affixed my signature in the presence of two witnesses.

STEPHEN OTHO WILSON.

Witnesses:
J. D. BOUSHALL,
F. S. BIGGS.